May 26, 1953     C. O. HOOVER     2,640,010
METHOD OF REMOVING SULFUR FROM PETROLEUM HYDROCARBONS
Filed Nov. 8, 1951
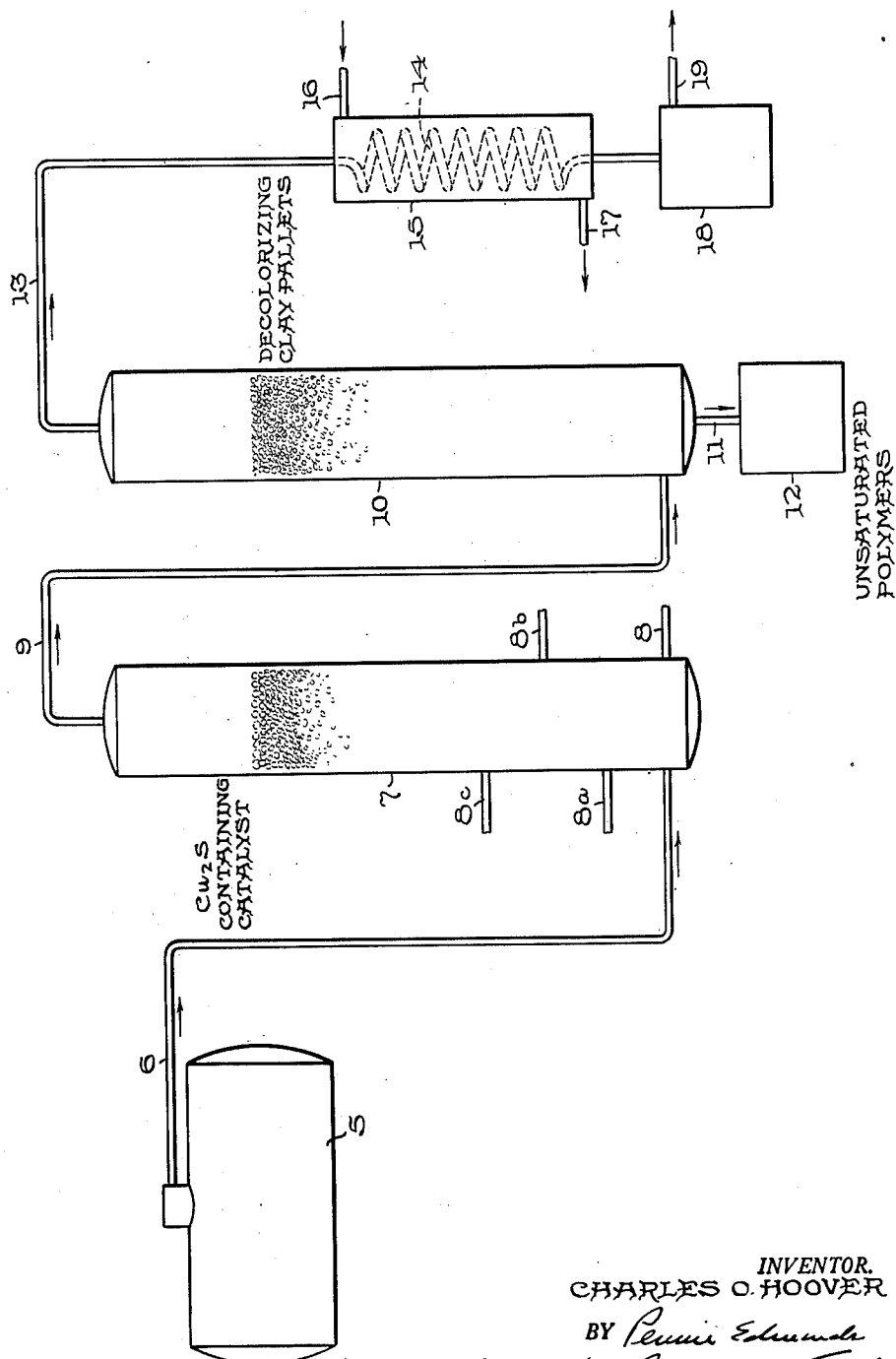
INVENTOR.
CHARLES O. HOOVER
BY Pennie Edmonds
Morton Barrows & Taylor
ATTORNEYS Patented May 26, 1953

2,640,010

UNITED STATES PATENT OFFICE 2,640,010

METHOD OF REMOVING SULFUR FROM PETROLEUM HYDROCARBONS

Charles O. Hoover, Houston, Tex., assignor to Air Reduction Company, Incorporated, New York, N. Y., a corporation of New York Application November 8, 1951, Serial No. 255,341

19 Claims. (Cl. 196—28)

This invention relates to the treatment of petroleum hydrocarbons and distillates therefrom and particularly to the removal of undesirable sulphur compounds from petroleum hydrocarbons. Crude petroleum usually contains sulphur in various forms, including hydrogen sulphide, mercaptans, disulphides and the like. These and various decomposition products thereof are carried over in distillates which afford a serious corrosion problem in the treatment and use of the distillates. The sulphur problem, which is especially troublesome in crudes and distillates from certain fields, has never been overcome satisfactorily.

It is the object of the present invention to provide a simple, effective and relatively inexpensive procedure whereby most of all of the sulphur compounds present in petroleum distillates, such as gasoline, naphtha, kerosene, gas, oil, etc., can be removed effectively.

Other objects and advantages of the invention will be apparent as it is better understood by reference to the following specification and the accompanying drawing, which represents diagrammatically an apparatus suitable for the practice of the invention.

I have discovered that the sulphur compounds usually present in petroleum distillates can be removed readily by passing the vapor of the distillate at a temperature between 550° and 950° F. over a catalyst in the presence of oxygen. The boiling range and the types of sulfur compounds contained in the hydrocarbons being desulfurized will dictate the operating temperature. Hydrocarbons having high boiling points and containing high percentages of residual sulfur compounds will require higher temperatures to bring about desulfurization. The most effective temperatures are from 750°–850° F.

Catalysts which may be used include cuprous sulphide, and mixtures of cuprous sulphide with aluminum silicates, or alumina, or mixtures of alumina and silica.

The cuprous sulphide may be the chemically pure product, or it may contain small amounts of impurities, for example, it may contain as much as 5% of copper sulphate, or it may be the impure product produced during the refining of sulphide ores, and sometimes referred to in the copper refining industry as "copper white metal," and still be effective as a catalyst. The copper white metal usually contains, as impurities, iron, gold, silver and silica in small and varied quantities. The only advantage in the use of this impure form of cuprous sulphide is that it is more readily obtained and is cheaper.

Examples of aluminum silicates which may be used with the cuprous sulphide are natural clays, such as kaolin, fuller's earth, and bentonite, including sub-bentonite.

The mixtures of alumina and silica which may be used with the cuprous sulphide include such natural materials as montmorillonite, or synthetically prepared mixtures containing silica and alumina in varying amounts. An example of the latter type of catalyst is the product sold under the name of "Sovabead" for use in thermal catalytic cracking.

The catalyst may be used in the form of a powder or in the form of beads or pellets, preferably of small size. For example, beads having a size of the order of 200 mesh (U. S. Standard Series) have been found very satisfactory since they provide a large surface area and, therefore, have greater catalytic activity. However, beads or pellets up to one-eighth or one-half inch in size may be used. The shape of the beads or pellets is not material. The only restriction on the smallness of the individual particles is that they must not be so small that vapors of the petroleum distillate, under the existing pressure, cannot readily pass through the mass of them. It is important, from the standpoint of size of the apparatus, that the catalytic material afford the maximum surface contact with the vapors which should pass freely through the catalytic mass together with the oxygen which is supplied thereto.

While the use of cuprous sulphide alone has been found to bring about the removal of sulphur compounds present in petroleum distilates, I prefer to use a mixture of cuprous sulphide and alumina, or a silicate, or a silica-alumina material. Such mixtures may vary from 1% of cuprous sulphide to 99% of the alumina, or silicate, or silica-alumina material to 1% of the alumina, or the silicate, or silica-alumina material to 99% of the cuprous sulphide, although normally a small amount, say from about 2% to 5%, more or less, of a lubricant, such as oil or graphite, will be added to the mixture to assist in the ejection of the beads or pellets, during their formation, from the forming die of the pelletizing or beading machine. One catalyst which was found to be particularly effective in removing larger amounts of sulphur for a much greater length of time than when the components were used separately under identical conditions on the same sulphur-containing petroleum distillates consisted of a homogeneous, pelletized mixture of 48% cuprous sulphide, 48% of a silica-alumina material and 4% of graphite.

When the catalyst consists of cuprous sulphide and one or more of the above-named materials, it is preferred that they be formed into a homogeneous mixture and used in the form of beads or pellets. The catalytic materials may be used in alternate layers, but this ordinarily is not as effective as when the materials are formed into a homogeneous mixture.

The oxygen used is preferably commercial oxygen of a purity of 99.5% or better, but oxygen-enriched air containing more than the normal percentage of oxygen may be used, as for example 25% oxygen or more up to 99.5% oxygen. Even air may be used as the oxidizing agent, but the large percentage of nitrogen introduced with the oxygen will result in some difficulty in the final condensation of the vapor, necessitating the use of lower condensing temperatures than are otherwise necessary in order to prevent the escape of valuable vapor with the waste nitrogen. The amount of oxygen supplied will depend upon the sulphur content of the vapor which can be determined in advance so that the proper amount of oxygen to oxidize the sulphur present may be introduced. The optimum amount of oxygen can be determined by the ability of the catalyst to maintain a constant rate of sulphur removal.

While not desiring to be limited to any particular theory, it is believed that sulphur contained in the petroleum distillates is deposited on the catalyst in such a form that the added oxygen can, under existing conditions, react with the newly deposited sulphur to form sulphur dioxide gas which readily leaves the reaction area along with the passing hydrocarbon vapor; with this series of operations repeating over and over. Thus, the oxygen will be added until the amount of sulphur removed from the hydrocarbon remains constant, regardless of the further addition of oxygen.

It has been found during the desulfurizing of a West Texas distillate containing 0.821 per cent sulfur that 1.25 cubic feet of oxygen per barrel (42 gallons) was sufficient.

It is essential that the oxygen be added in the catalyst bed proper. It should not be premixed with the incoming oil vapor, since such premixing results in an excessive amount of hydrocarbon oxidation taking place, thereby damaging the product beyond repair for meeting standard specifications for such products.

Also, it has been found desirable to add the oxygen at several different points throughout the catalyst bed intermittently at the several different points and to alternate the points of entry by closing off some of the entry ports for a fixed time, say, for from 5 to 7 minutes, and then re-establish the oxygen feed through the bed for a similar length of time. By following this procedure excessive over-heating at the points of entry of the oxygen is prevented, and the formation of coke, etc., is retarded.

It is not necessary that the incoming oxygen to the reactor be preheated, but, it is preferred that the temperature of the incoming oxygen be raised to that of the reaction chamber to eliminate the possibility of cooling the incoming oil vapor and, thus, prevent as far as possible the formation of tars which would be readily converted to coke which would soon plug the catalyst bed.

The oxidation of sulphur results in some discoloration of the resulting condensate which is undesirable in the trade. However, this is easily overcome by passing the vapors through an adsorbent clay such as is commonly used for the purpose of decolorizing petroleum products.

The pressure in the reaction chamber may vary from atmospheric to 250 lbs. gage. This may be determined by the requirement of the equipment in which the process is carried out.

As the result of the procedure, unsaturates such as olefins present in the petroleum or formed during the distillation polymerize and condense in liquid form during the treatment of the vapors with the decolorizing clay. The polymers descend to the bottom of the decolorizing tower and are withdrawn, while the decolorized vapors escape to the condenser.

Referring to the drawing, 5 indicates a suitable still in which the material to be treated, i. e., crude petroleum or a distillate therefrom, is vaporized by the application of heat. The vapor is delivered through a pipe 6 to the bottom of a tower 7. Oxygen or a gas containing oxygen is introduced through pipes 8, 8$^a$, 8$^b$ and 8$^c$ in the required proportions and mixed with the vapors of the petroleum hydrocarbon. The introduction of the oxygen or the oxygen-containing gas through the pipes 8, 8$^a$, 8$^b$ and 8$^c$ preferably is intermittent and in alternation so that excessive over-heating at the respective points of entry of the oxygen does not occur. The vapors pass upwardly through the tower 7 in intimate contact with the previously-described catalyst in the form of pellets or masses of suitable form, affording a large surface contact between the catalyst and the vapors and oxygen. The catalyst acts as an oxidizing catalyst, and, in the presence of oxygen, the sulphur compounds in the petroleum hydrocarbons are oxidized to sulphur dioxide.

The vapors, including the sulphur dioxide, any excess of oxygen, and nitrogen, if it is mixed with the oxygen, escape through a pipe 9 to the bottom of a second column 10. The latter is filled with a decolorizing clay such as is commonly used for decolorizing petroleum products. The clay may be in the form of pellets or other masses arranged to permit the vapors to pass readily therethrough while the materials which color the product are separated. Among such materials are the unsaturates such as the olefins which may be present in the crude petroleum or may be formed during the operation. The unsaturates form polymers which are liquids and which descend through the column 10 and escape through a pipe 11, collecting in a container 12.

The vapors from the column 10 are delivered through a pipe 13 to a condensing coil 14 disposed in a condenser 15 which may be cooled with water supplied through a pipe 16 and withdrawn through a pipe 17. Water is ordinarily sufficient as a cooling agent, but if considerable amounts of nitrogen are present with the vapors, it may be necessary to cool at a lower temperature in which case cold brine or other suitable cooling means may be substituted for the cooling water. The condensate collects in a receptacle 18 and the sulphur dioxide and any remaining gases are vapors are withdrawn through a pipe 19.

Preferably the vapors introduced to the column 7 through the pipe 6 are heated to a temperature of between 750° and 850° F. If necessary, means may be employed to maintain the temperature of the vapors in the column 7, although normally that is not necessary. The temperature of the column 10 may be that temperature to which the vapors normally drop in passing from the column 7 to the column 10. Usually the temperature is in the neighborhood of 460° F.

The condensate received in the receptacle 18 is a water-white condensate free from coloring material and substantially free from the sulphur compounds which contaminate the petroleum hydrocarbons which are fed to the system. The procedure may be employed in the treatment of crude petroleum, which is vaporized in the still 5, or distillates from crude petroleum may be similarly treated.

Instead of initially charging the tower 7 with the catalyst containing cuprous sulphide, it initially may be charged with a similar catalyst except that cupric sulphide is used instead of cuprous sulphide, since, in the presence of the gaseous oxygen the cupric sulphide will be converted, at least in part, to cuprous sulphide, which thereafter will be effective to remove sulphur compounds from the hydrocarbon vapors.

The table set forth below shows the improved results obtained by the use of the present method of desulphurization compared to the present conventional procedure in the desulphurization of a West Texas pipe line crude having a 32.5 A. P. I. gravity and a 1.60% total sulphur content. In each instance the catalytic bed was maintained at 850° F., and air was added at the rate of 6.25 cu. ft. per barrel of crude.

|  | Percent Sulphur after conventional treatment | Percent Sulphur after present treatment | Percent Advantage of present treatment |
|---|---|---|---|
| Gasoline | 0.191 | 0.025 | 87.0 |
| Naphtha | 0.270 | 0.080 | 70.3 |
| Kerosene | 0.830 | 0.120 | 85.4 |
| Gas oil | 1.520 | 0.608 | 60.0 |

The following table shows the octanes of the gasolines recovered by the above two processes without the addition of tetraethyl lead, and with 3 ml. of tetraethyl lead, respectively.

| Produced by Conventional Procedure | | Produced by Present Procedure | |
|---|---|---|---|
| Clear | 3 ml. T. E. L. | Clear | 3 ml. T. E. L. |
| Octane | | Octane | |
| 65.6 | 76.7 | 66.6 | 81.9 |

Various changes may be made in the form and arrangement of the apparatus and in the procedure as described without departing from the invention or sacrificing the advantages thereof.

This application is a continuation-in-part of my abandoned application Serial No. 63,408, filed December 3, 1948.

I claim:
1. The method of removing the major portion of all sulphur compounds contained in petroleum hydrocarbons which comprises oxidizing sulphur of the sulphur compounds to sulphur dioxide by passing the vapor of the hydrocarbon over an oxidation catalyst consisting essentially of a material containing cuprous sulphide in the presence of gaseous oxygen.

2. The method of claim 1 in which the oxygen is introduced directly into the catalyst mass.

3. The method of claim 2 in which the oxygen is introduced into the catalyst mass at a plurality of spaced points.

4. The method of claim 3 in which the oxygen is introduced intermittently and alternately at said spaced points.

5. The method of claim 1 in which the vapors of the hydrocarbon are at a temperature between 550° F. and 950° F. when they are initially contacted with the catalyst.

6. The method of removing the major portion of all sulphur compounds contained in petroleum hydrocarbons which comprises oxidizing sulphur of the sulphur compounds to sulphur dioxide by passing the vapor of the hydrocarbon over an oxidation catalyst consisting essentially of a material from the class consisting of cuprous sulphide, a mixture of cuprous sulphide and an aluminum silicate, a mixture of cuprous sulphide and alumina and a mixture of cuprous sulphide, alumina and silica, in the presence of oxygen, and separating the hydrocarbon in a liquid state from the sulphur dioxide formed by the action of the catalyst.

7. The method of claim 6 in which the vapor of the hydrocarbon is at a temperature between 550° F. and 950° F. when it is initially contacted with the catalyst.

8. The method of claim 6 in which the vapor of the hydrocarbon is at a temperature of between 750° F. and 850° F. when it is initially contacted with the catalyst.

9. The method of removing the major portion of all sulphur compounds contained in petroleum hydrocarbons which comprises oxidizing sulphur of the sulphur compounds to sulphur dioxide by passing the vapor of the hydrocarbon over an oxidation catalyst consisting essentially of a material from the class consisting of cuprous sulphide, a mixture of cuprous sulphide and an aluminum silicate, a mixture of cuprous sulphide and alumina and a mixture of cuprous sulphide, alumina and silica, in the presence of gaseous oxygen, removing color-forming bodies produced in the vapor by the action of the catalyst, and separating the hydrocarbon in a liquid state from the sulphur dioxide formed by the action of the catalyst.

10. The method of removing the major portion of all sulphur compounds contained in petroleum hydrocarbons which comprises oxidizing sulphur of the sulphur compounds to sulphur dioxide by passing the vapor of the hydrocarbon over an oxidation catalyst consisting essentially of a material from the class consisting of cuprous sulphide, a mixture of cuprous sulphide and an aluminum silicate, a mixture of cuprous sulphide and alumina and a mixture of cuprous sulphide, alumina and silica, in the presence of gaseous oxygen, removing color-forming bodies produced in the vapor by the action of the catalyst, separating in the liquid phase, the polymers formed as a result of the polymerization of the color-forming bodies, and condensing the remainder of the vapor to separate the hydrocarbon thereof in a liquid state from the sulphur dioxide formed by the action of the catalyst.

11. The method of claim 1 in which the temperature of the oxygen added to the re-action zone is substantially that of the re-action zone.

12. The method of removing the major portion of all sulphur compounds contained in petroleum hydrocarbons which comprises oxidizing sulphur of the sulphur compounds to sulphur dioxide by passing the vapor of the hydrocarbon over an oxidation catalyst consisting essentially of a homogeneous mixture of cuprous sulphide and an aluminum silicate, in the presence of gaseous oxygen, and separating hydrocarbon in a liquid state from the sulphur dioxide formed by the action of the catalyst.

13. The method of removing the major portion of all sulphur compounds contained in petroleum hydrocarbons which comprises oxidizing sulphur of the sulphur compounds to sulphur dioxide by passing the vapor of the hydrocarbon over an oxidation catalyst consisting essentially of a homogeneous mixture of cuprous sulphide and a silica-alumina material, in the presence of gaseous oxygen, and separating the hydrocarbon in a liquid state from the sulphur dioxide formed by the action of the catalyst.

14. The method of removing the major portion of all sulphur compounds contained in petroleum hydrocarbons which comprises oxidizing sulphur of the sulphur compounds to sulphur dioxide by passing the vapor of the hydrocarbon over an oxidation catalyst consisting essentially of a homogeneous mixture of cuprous sulphide and alumina, in the presence of gaseous oxygen, separating the hydrocarbon in a liquid state from the sulphur dioxide formed by the action of the catalyst.

15. The method of removing the major portion of all sulphur compounds contained in petroleum hydrocarbons which comprises oxidizing sulphur of the sulphur compounds to sulphur dioxide by passing the vapor of the hydrocarbon over an oxidation catalyst consisting essentially of cuprous sulphide in the presence of gaseous oxygen, and separating the hydrocarbon in a liquid state from the sulphur dioxide formed by the action of the catalyst.

16. The method of removing the major portion of all sulphur compounds contained in petroleum hydrocarbons which comprises oxidizing sulphur of the sulphur compounds to sulphur dioxide by passing the vapor of the hydrocarbon at a temperature between 750° F. and 850° F. over an oxidation catalyst consisting essentially of cuprous sulphide in the presence of gaseous oxygen, and separating the hydrocarbon in a liquid state from the sulphur dioxide formed by the action of the catalyst.

17. The method of removing the major portion of all sulphur compounds contained in petroleum hydrocarbons which comprises oxidizing sulphur of the sulphur compounds to sulphur dioxide by passing the vapor of the hydrocarbon over an oxidation catalyst consisting essentially of cuprous sulphide in the presence of gaseous oxygen, removing color-forming bodies produced in the vapor by the action of the catalyst, and separating the hydrocarbon in a liquid state from the sulphur dioxide formed by the action of the catalyst.

18. The method of removing the major portion of all sulphur compounds contained in petroleum hydrocarbons which comprises oxidizing sulphur of the sulphur compounds to sulphur dioxide by passing the vapor of the hydrocarbon over an oxidation catalyst consisting essentially of cuprous sulphide in the presence of gaseous oxygen, removing color-forming bodies produced in the vapor by the action of the catalyst, separating in the liquid phase, the polymers formed as a result of the polymerization of the color-forming bodies, and condensing the remainder of the vapor to separate the hydrocarbon thereof in a liquid state from the sulphur dioxide formed by the action of the catalyst.

19. The method of claim 1 in which the catalyst is in the form of beads or pellets having a maximum length in any direction not substantially exceeding one-half inch.

CHARLES O. HOOVER.

References Cited in the file of this patent

UNITED STATES PATENTS

| Number | Name | Date |
|---|---|---|
| 1,840,158 | Cross | Jan. 5, 1932 |
| 2,042,053 | Hoover | May 26, 1936 |
| 2,228,041 | Yabroff et al. | Jan. 7, 1941 |

FOREIGN PATENTS

| Number | Country | Date |
|---|---|---|
| 588,765 | Great Britain | June 3, 1947 |